March 26, 1968

C. R. SCHOTTEL 3,374,691

VARIABLE SPEED TRANSMISSION

Filed May 11, 1966

INVENTOR
CHARLES R. SCHOTTEL
BY Cohn and Powell
ATTORNEYS

March 26, 1968 C. R. SCHOTTEL 3,374,691
VARIABLE SPEED TRANSMISSION
Filed May 11, 1966 7 Sheets-Sheet 2

INVENTOR
CHARLES R. SCHOTTEL
BY Cohn and Powell
ATTORNEYS

March 26, 1968 C. R. SCHOTTEL 3,374,691
VARIABLE SPEED TRANSMISSION
Filed May 11, 1966 7 Sheets-Sheet 4
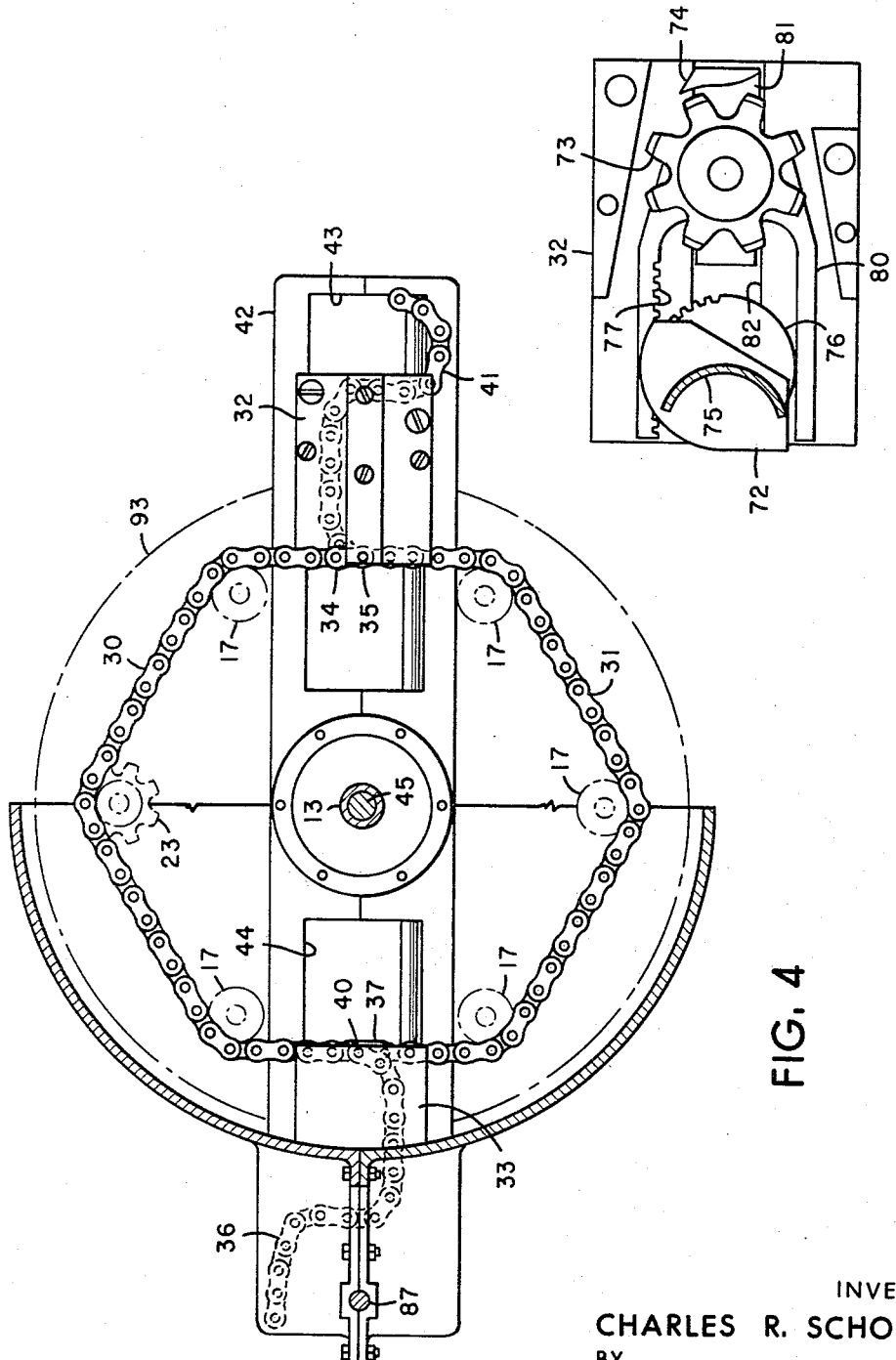
INVENTOR
CHARLES R. SCHOTTEL
BY Cohn and Powell
ATTORNEYS

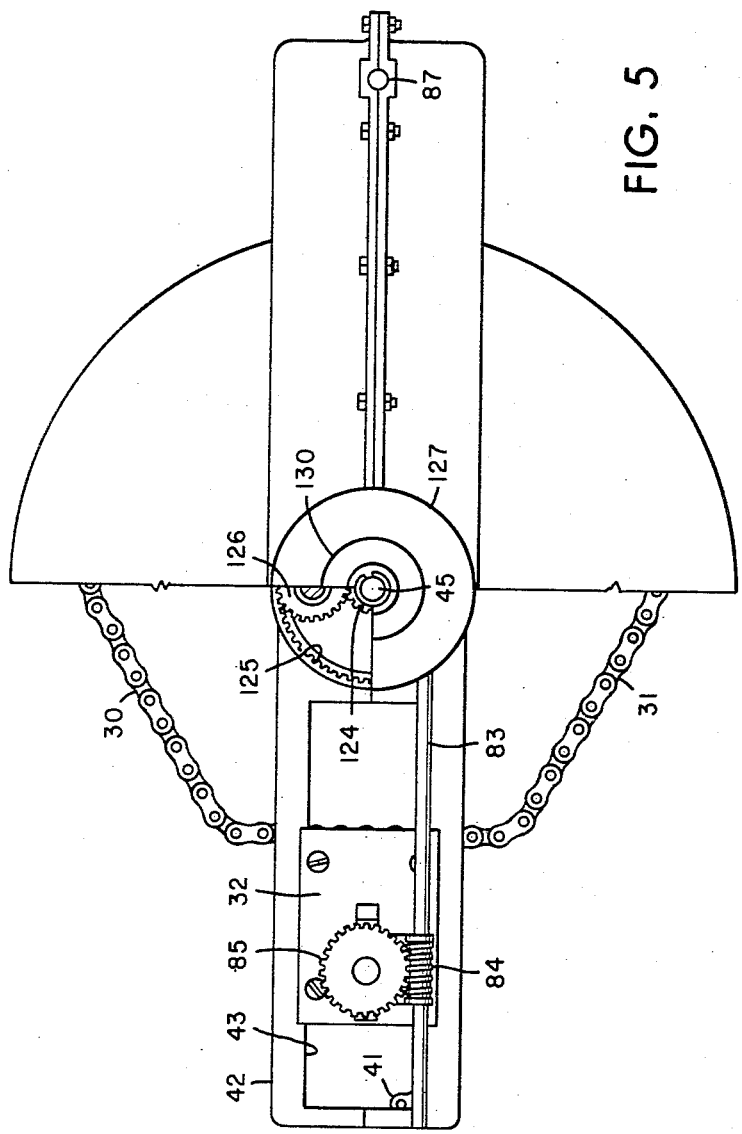

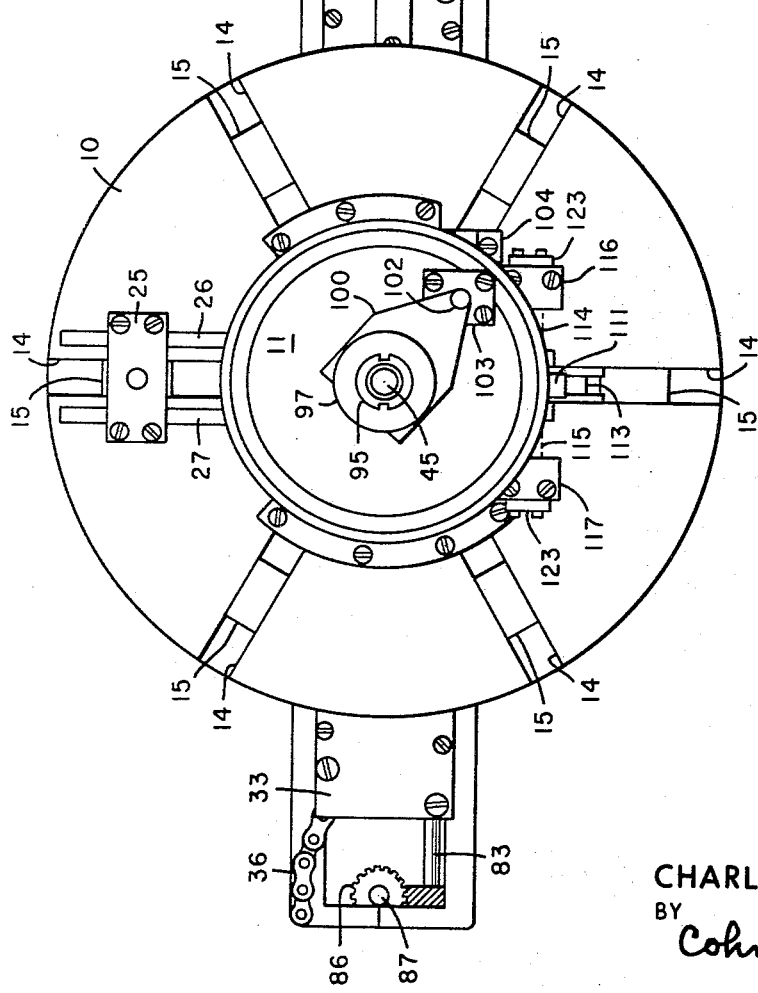

March 26, 1968   C. R. SCHOTTEL   3,374,691
VARIABLE SPEED TRANSMISSION
Filed May 11, 1966   7 Sheets-Sheet 7
FIG. 11
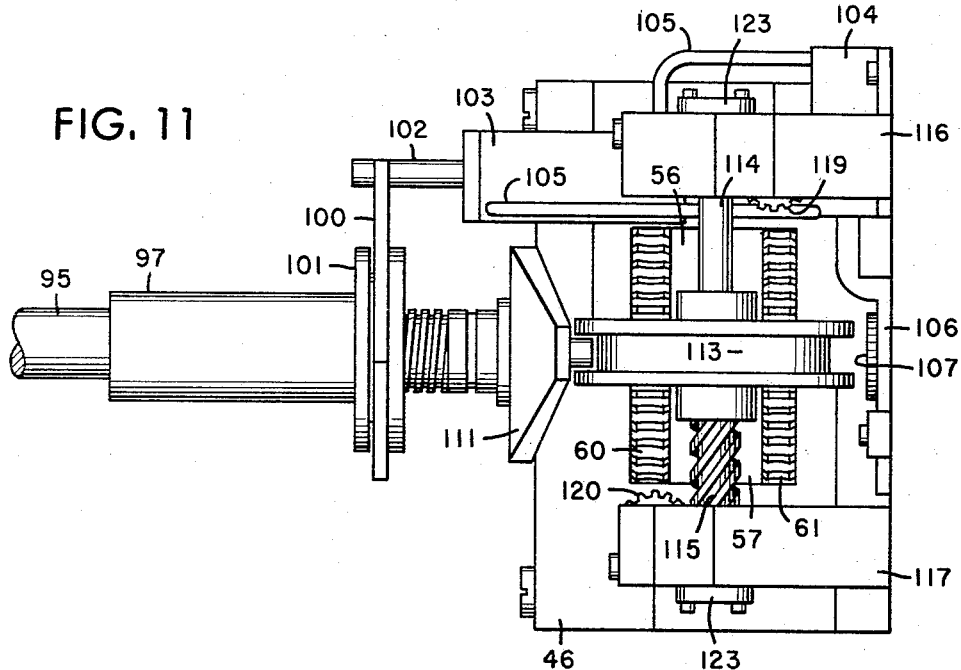
FIG. 10
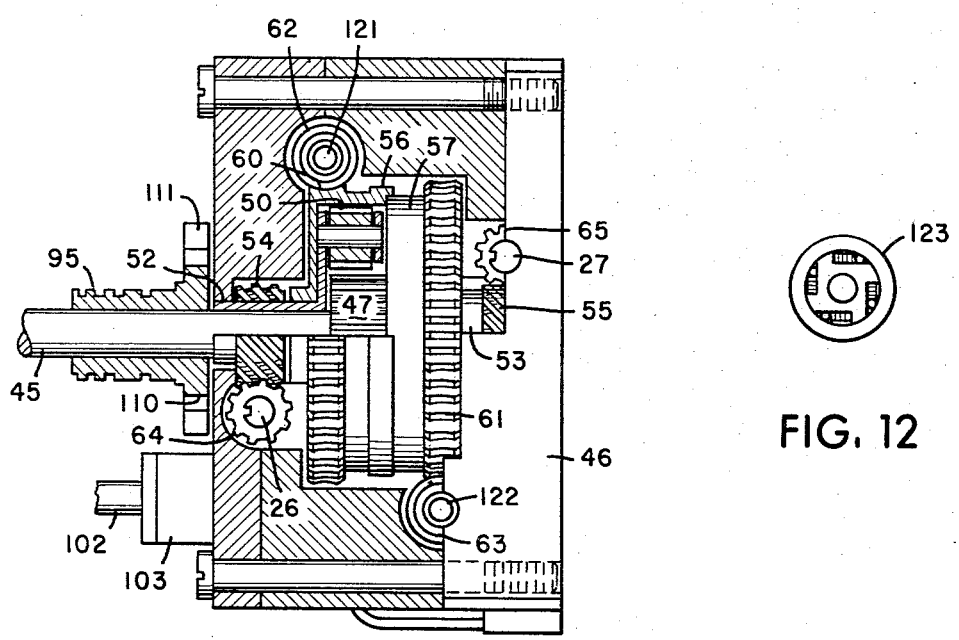
FIG. 12
INVENTOR
CHARLES R. SCHOTTEL
BY Cohn and Powell
ATTORNEYS

United States Patent Office 3,374,691
Patented Mar. 26, 1968

3,374,691
VARIABLE SPEED TRANSMISSION
Charles R. Schottel, 115 Kingsbury Court,
Collinsville, Ill. 62234
Filed May 11, 1966, Ser. No. 549,415
18 Claims. (Cl. 74—674)

This invention relates generally to improvements in a variable speed transmission, and more particularly to improvements providing an infinite number of speed ratios in a designed range.

An important objective is achieved by the provision of a variable speed transmission that utilizes the same power train in all speeds, yet allows an infinite number of ratios over a designed range between a drive shaft and a driven shaft while maintaining a positive mechanical connection between such shafts, and which maintains a constant torque.

Another important objective is realized by the provision of a non-rotating chain, defining a perimeter, which meshes with sprockets rotatively mounted on and carried by a rotary head operatively connected to and driving a driven shaft. A drive means operatively interconnects a drive shaft and the sprockets, and consequently turns the rotary head and driven shaft as the sprockets move around the chain. A slide mechanism carries the chain and is movable to accommodate the flexing action of the chain as the sprockets revolve around the chain perimeter.

Yet another important objective is afforded by the provision of sprocket-adjusting means operatively connected to the sprockets to position the sprockets selectively at predetermined radial distances from the rotative axis of the rotary head to vary the speed ratio of the drive shaft and driven shaft, and by the provision of a chain-adjusting means operatively connected to the chain for selectively changing the length of the chain perimeter to accommodate any change in sprocket position and to maintain effective meshing engagement of the sprockets and chain.

An important objective is attained by the provision of means operatively interconnecting the sprocket-adjusting means and the chain-adjusting means so as to vary synchronously the radial distance of the sprockets and the length of the chain perimeter.

Another important objective is provided by a strucural arrangement in which a positioning plate is rotatively mounted on and is carried by a drive plate, constituting the rotary head, so as to rotate therewith, the positioning plate including cam means operatively connected to the sprockets and a bearing block slidably mounting the sprockets in a radial slot formed in the drive plate. The positioning plate can be turned relative to the drive plate so that the cam means selectively changes the position of the bearing block in the radial slot, and thereby changes the radial position of the sprockets.

Still another important objective is achieved in that the chain-adjusting means includes a guide that engages an end of the chain to define a center of restriction that is coincident to the center of restriction of the adjacent end of the chain fixed to the slide member of the slide mechanism. A feed wheel is carried by the slide member and operatively receives the chain end from the guide. Means is operatively connected to the feed wheel so as to turn the feed wheel, and thereby shorten or lengthen the chain perimeter, while the guide maintains the coincident centers of restriction.

An important object is realized by the provision of a positive connection between a centerless bearing mounting the chain guide and a journal block slidably mounted in the slide member and carrying the feed wheel, the positive connection moving the feed wheel toward or away from the guide depending on the direction of rotation of the chain guide to keep the chain at substantially constant tension regardless of the flexing of the chain at the centers of restriction.

Another important objective is afforded by the structural arrangement of the chain that includes a pair of relatively offset chain sections, each chain section comprising one-half the perimeter enclosing the sprockets. A pair of relatively offset sprockets alternately mesh with the relatively offset chain sections.

A further important objective is attained by the provision of a sprocket synchronization mechanism operatively connecting the sprocket-adjusting means and the chain-adjusting means to the drive means to advance one sprocket relative to the other sprocket so that the angular difference in the two sprockets assures operative meshing with the chain sections regardless of a change in chain perimeter length.

An important objective is provided in that the drive means includes a pair of drive trains interconnected operatively to the drive shaft, each drive train being operatively connected to one of the pair of sprockets to drive the sprockets independently.

Another important objective is achieved in that the transmission is especially useful to maintain a constant speed on a driven shaft that is being driven by a drive shaft of constantly varying speed, is useful to transmit power through various speed ratios by means of gearing assemblies, and is useful in industrial machinery of various types wherein varying speeds and torques are required.

An important objective is to provide a variable speed transmission that is simple and durable in construction, economical to manufacture and assemble, highly efficient in operation, and which can be utilized by anyone with little or no instruction.

The foregoing and numerous other objects and advantages of the invention will more clearly appear from the following detailed description of a preferred embodiment, particularly when considered in connection with the accompanying drawings, in which:

FIG. 4 is an end view of the chain as seen from the left-hand side of FIG. 2 along section line A—A;

FIG. 5 is an axial end view as seen from the right-hand side of FIG. 2;

FIG. 6 is an axial view of the transmission assembly removed from the transmission case and looking at the back of the drive plate;

FIG. 7 is a side elevational view of the internal mechanism of a chain slide member;

FIG. 8 is a top plan view of the chain slide member shown in FIG. 7;

FIG. 10 is a sectional view of the drive gear assembly as seen in a horizontal plane passed through the longitudinal axis;

FIG. 11 is a fragmentary view of the drive gear assembly as viewed from the left of FIG. 9, and FIG. 12 is an end view of the limit clutch as taken along line 12—12 of FIG. 9.

Figure 1:
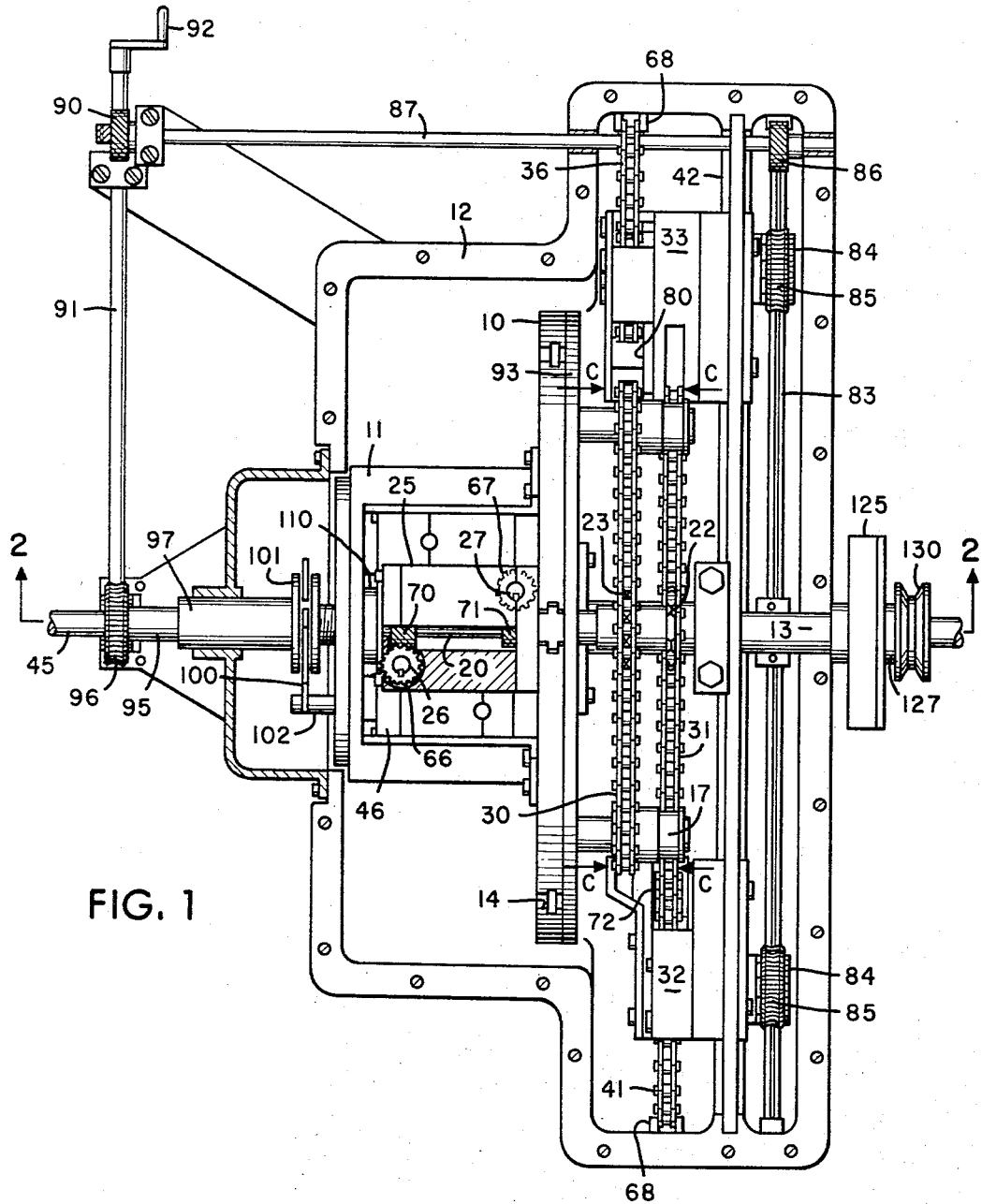
FIG. 1 is a top plan view of the transmission with the top half of the transmission case and the cover of the sprocket-adjusting means, removed.

Referring now by characters of reference to the drawing, it will be understood that a circular drive plate 10 constituting a rotary head is fastened to a cylindrical support 11 that is rotatively mounted in the transmission case 12. Fastened to and rotatable with the drive plate 10 is a driven shaft 13.

Figure 2:
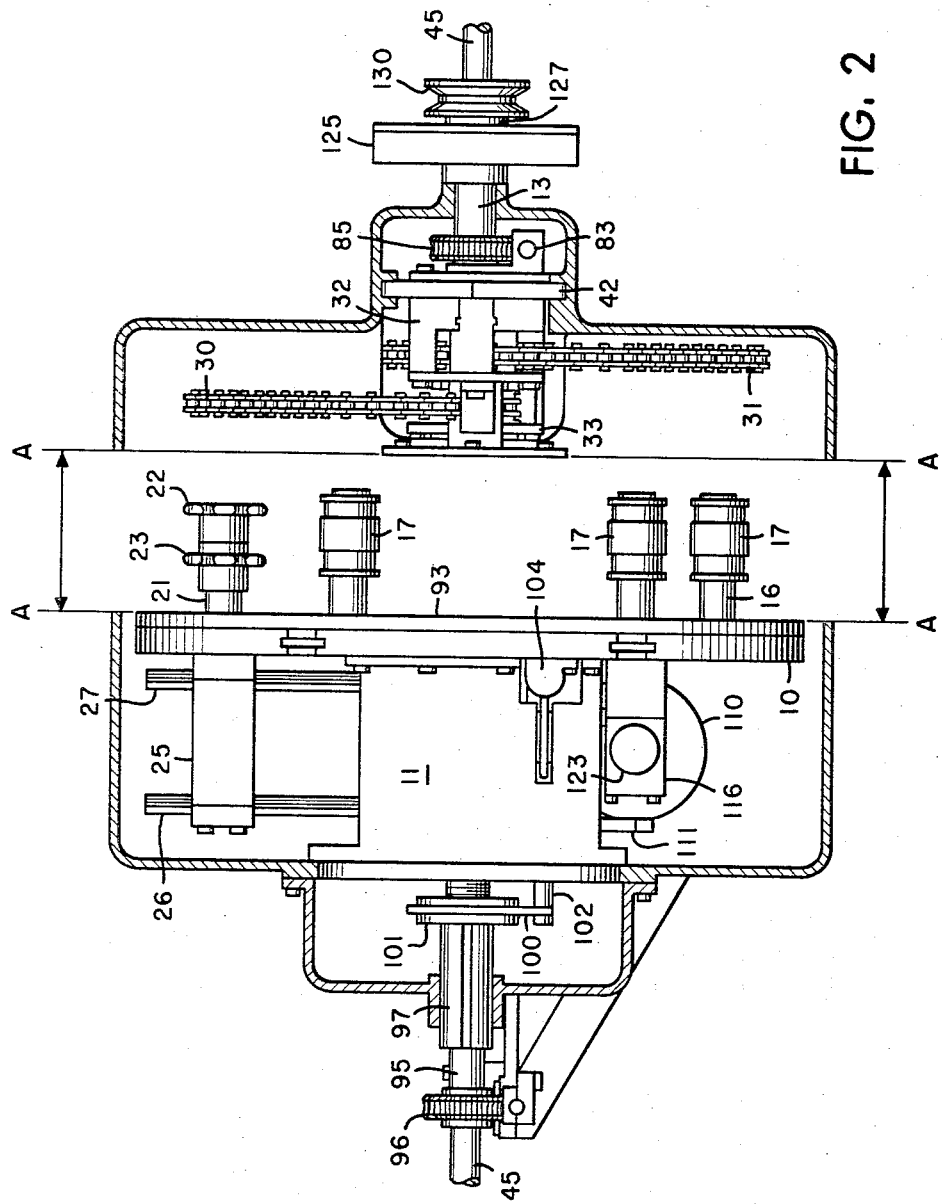
FIG. 2 is a side elevational view with the transmission case cut away, the sprockets being separated from the coacting chain sections for the sake of clarity.
Figure 3:
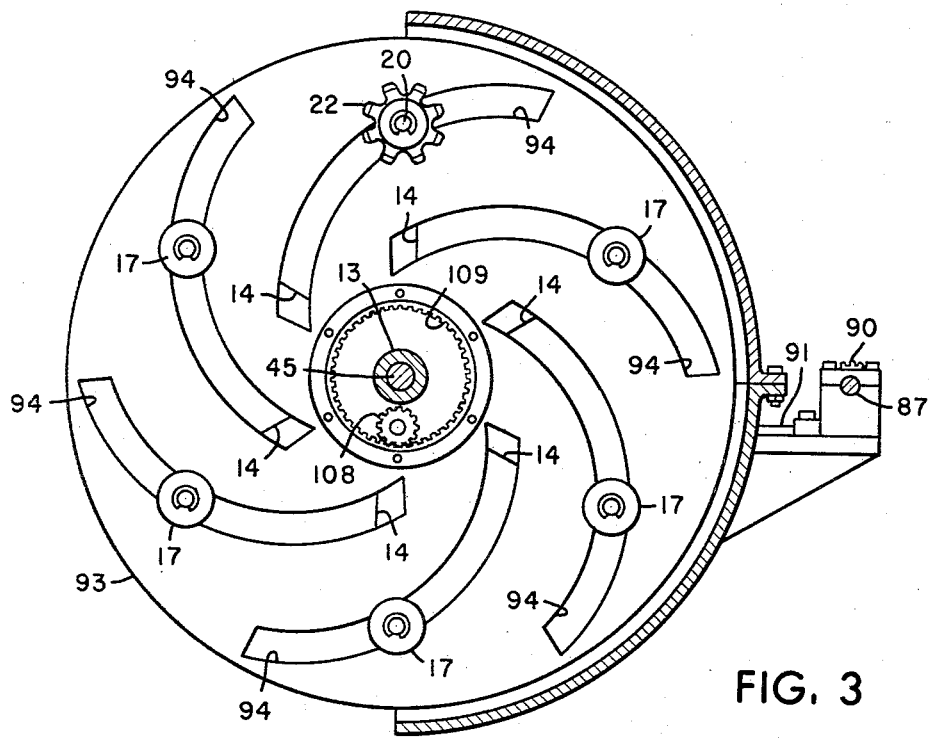
FIG. 3 is an end view of the sprockets and rollers as seen from the right-hand side of FIG. 2 along section line A—A.
Figure 9:
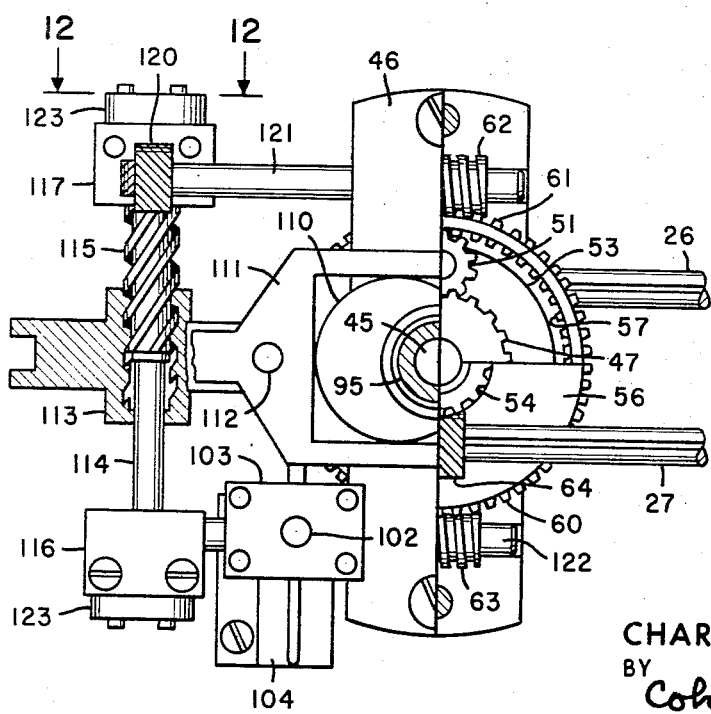
FIG. 9 is an axial end view of the drive gear assembly as seen from the sprocket-adjusting means end of the transmission.

As is best seen in FIG. 6, the drive plate 10 is provided with a plurality (a total of six in the embodiment illustrated) of radial slots 14. Slidably mounted in each of the radial slots 14 is a bearing block 15. From FIGS. 2 and 3, it is seen that each of the bearing blocks 15, except one, carries a stub shaft 16 on which is rotatively mounted a double-groove roller 17. For reasons which will later appear, the rollers 17 have grooves that are laterally offset to provide a double track.

The remaining bearing block 15 carries concentric shafts 20 and 21. A sprocket 22 is attached to and rotatable with the inner shaft 20, while a sprocket 23 is fixed to and rotatable with the outer shaft 21. The pair of sprockets 22 and 23 are laterally offset so as to be aligned with and lie in the same plane as the laterally offset grooves of the roller 17. The concentric shafts 20 and 21 are rotatively mounted and carried by a sprocket slide mechanism 25 located on the opposite side of the drive plate 10. As will be understood from later detailed description of parts, the sprocket slide mechanism 25 constitutes a carriage that is reciprocatively mounted on a pair of splined shafts 26 and 27.

The sprockets 22 and 23 engage a non-rotating drive chain consisting of two chain sections 30 and 31, each section comprising one-half the perimeter necessary to enclose the sprockets 22 and 23 and the rollers 17. The chain sections 30 and 31 are laterally offset so as to lie in the same plane as the laterally offset sprockets 23 and 22 respectively. The chain sections 30 and 31 are mounted on chain slide members 32 and 33, constituting part of a slide mechanism. More particularly, one end 34 of chain section 30 is fixed to the slide member 32 by pin 35, defining a center of restriction. The opposite end 36 of chain 30 is passed through the slide member 33 as will be later described. One end 37 of chain section 31 is fixed to the slide member 33 by a pin 40, defining a center of restriction. The opposite end 41 of chain section 31 is passed through the slide member 32. The slide members 32 and 33 are held in the slide support 42, and are reciprocatively mounted for slidable movement in guideways 43 and 44 respectively. The slide support 42 is held stationary in the transmission case. The slide members 32 and 33 restrict the chain sections 30 and 31 from rotating, but allow free flexing movement of the chain sections 30 and 31 to accommodate the rotative movement of the sprockets 22 and 23 and the rollers 17.

The drive means for drivingly rotating the sprockets 22 and 23 includes a drive shaft 45 extending longitudinally and axially through the transmission case 12, through the main drive mechanism support 46 and through the drive plate 10, concentric internally with the driven shaft 13.

A differential gearing within the main drive mechanism support 46 operatively interconnects the drive shaft 45 with the sprockets 22 and 23. The differential gearing provides a pair of drive trains adapted to rotate the sprockets 22 and 23 independently. The differential gearing includes a sun gear 47 attached to and driven by the drive shaft 45. The sun gear 47 engages two identical sets of planetary gears 50 and 51 carried by a pair of planetary carriers 52 and 53 rotatively mounted on the drive shaft 45. Attached to and driven by the planetary carriers 52 and 53 are helical gears 54 and 55 respectively. The planetary gears 50 and 51 rotate about the sun gear 47 and rotate within a pair of ring gears 56 and 57 respectively. The ring gears 56 and 57 are provided with external worm gears 60 and 61 that engage with screw gears 62 and 63 respectively to preclude unintentional rotation of the ring gears 56 and 57.

The helical gears 54 and 55 mesh with and drive coacting helical gears 64 and 65 respectively which are fastened to the parallel shafts 26 and 27 respectively on which the sprocket slide mechanism 25 is reciprocatively mounted. The shafts 26 and 27 are splined to allow helical gears 66 and 67 in the sprocket slide mechanism 25 to move axially along such shafts 26 and 27 respectively. The helical gears 66 and 67 drive helical gears 70 and 71 respectively which are rigidly connected through concentric shafts 20 and 21 to the sprockets 22 and 23 respectively.

Upon rotation of the drive shaft 45, the sun gear 47 acting through the planetary gears 50 and 51 and the coacting planetary carriers 52 and 53, drives the helical gears 54 and 55. It will be understood that the ring gears 56 and 57 are held relatively stationary by the meshing engagement of the screw gears 62 and 63 with the worm gears 60 and 61 formed on ring gears 56 and 57. Rotation of the helical gears 54 and 55 acts through the coacting helical gears 64 and 65 to turn the splined shafts 26 and 27, and thereby rotate the helical gears 66 and 67 mounted in the sprocket slide mechanism 25. The helical gears 70 and 71 meshing with the helical gears 66 and 67 cause rotation of the sprockets 22 and 23. The differential gearing enables the operative connection of the drive shaft 45 to the sprockets 22 and 23 by a pair of drive trains that operate to drive the sprockets 22 and 23 independently.

As the sprockets 22 and 23 are driven, they will alternately engage the chain sections 31 and 30 respectively. Because the chain sections 30 and 31 cannot rotate, but are allowed to flex freely upon engagement with the sprockets 22 and 23 and the rollers 17, the sprockets 22 and 23 meshing with the chain sections 31 and 30, cause a rotation of the drive plate 10 and all of the mechanism carried thereby. Rotation of the drive plate 10 causes a corresponding rotation of the driven shaft 13.

The slide mechanism carries the chain sections 30 and 31 and is movable to accommodate the flexing action of the chain sections 30 and 31 as the sprockets 22 and 23 revolve around the chain perimeter. The construction of the slide member 32 is illustrated in FIGS. 7 and 8. The construction of the slide member 33 is identical, but reversed so that a detailed description of one will suffice for the other. The chain end 41 of the chain section 31 is brought up through a slotted chain guide 72 and passed around a spricket 73, constituting a feed wheel, and then passed out the bottom of the slide member 32 and is fastened to the case 12 by the case appendage 68. A pawl 74 carried by the slide member 32 holds the chain end 41 in contact with the sprocket 73.

To keep the chain section 31 at constant tension in its half of the chain perimeter, the center of restriction of the drive chain end 36, where it passes through the slotted chain guide 72, must coincide with the center of restriction defined by the pin 35 where the pin 35 fastens the chain end 34 of the other chain section 30 to the slide member 32. This feature is accomplished by mounting the chain guide 72 in centerless bearings 75 located on each side of the chain guide 72. The rotative axis of the centerless bearings 75 coincide with the center of restriction defined by pin 35 for chain section 30. The aligned centers of restriction are located by arrows C—C in FIG. 1.

A cam gear 76 is an integral part of chain guide 72 and rotates with the chain guide 72 on the centers of restriction. A rack gear 77 on fork 80 is meshed with the cam gear 76. The fork 80 carries the sprocket 73. Any rotation of chain guide 72, clockwise or counterclockwise, will move sprocket 73 away from or toward the chain guide 72 depending on the direction of rotation of the chain guide 72, thereby keeping the chain section 31 at constant tension regardless of the flexing action of the chain sections 30 and 31 at their centers of restriction.

The pawl 74 is an integral part of the sprocket journal 81. The sprocket journal 81 carries sprocket 73 and is free to slide in a key-slot 82, formed in the slide member 32, under the reciprocative movement of the fork 80.

A chain-adjusting means is operatively connected to the chain sections 30 and 31 for selectively changing the length of the chain perimeter to accommodate any change in radial sprocket position and to maintain effective meshing engagement of the sprocket and chain. This chain-adjusting means includes a splined shaft 83 rotatively mounted at opposite sides of the transmission case 12 and extending longitudinally between and adjacent to the slide members 32 and 33. A pair of screw gears 84 are drivingly attached to the splined shaft 83 for rotation therewith, yet are mounted for longitudinal axial movement as will be later explained. The screw gears 84 mesh with coacting worm gears 85 operatively connected to and mounted on the shafts carrying the feed sprockets 73. Coacting helical gears 86 operatively interconnect the splined shaft 83 with shaft 87 rotatively mounted in the transmission casing 12. Helical gears 90 operatively interconnect the shaft 87 with a control shaft 91 that can be turned manually by a crank 92 or turned automatically by some power means (not shown).

A sprocket-adjusting means is operatively connected to the sprockets 22 and 23 to position the sprockets 22 and 23 selectively at predetermined radial distances from the rotative axis of drive plate 10 to vary the speed ratio of the drive shaft 45 and the driven shaft 13. The sprocket-adjusting means includes a sprocket-positioning plate 93 abutting one face of the drive plate 10, the sprocket-positioning plate 93 being operatively connected to the drive plate 10 for rotation therewith, yet being mounted for relative rotation within limits. For example, the sprocket-positioning plate 93 is provided with a plurality of arcuate slots 94, the margins of which define and constitute cam means. Each of the stub shafts 16 for the rollers 17 extend through one of the arcuate slots 94. Similarly, the concentric shafts 20 and 21 for the sprockets 22 and 23 extend through one of the arcuate slots 94. Upon relative rotation of the drive plate 10 and the sprocket-positioning plate 93, the margins defining the arcuate slots 94 will move the bearing blocks 15 inwardly or outwardly along the radial slots 14 formed in the drive plate 10, and consequently will move the rollers 17 and the sprockets 22 and 23 simultaneously, inwardly or outwardly.

Mounted concentrically on the drive shaft 45 is a radius control screw 95. Worm and screw gears 96 operatively interconnect the control shaft 91 with the radius control screw 95. Threadedly connected to and concentrically mounted on the radius control screw 95 is a radius control slide 97. The radius control slide 97 is constrained against rotation so that upon turning of the control screw 95, the control slide 97 will move axially.

A fork 100 is carried by the radius control slide 97 between a pair of collars 101. The fork 100 actuates a piston rod 102 of a double-acting hydraulic unit 103. The hydraulic unit 103 actuates another double-acting hydraulic unit 104 through hydraulic line 105, the hydraulic unit 104 moving a rack 106 across gear 107. Another gear 108 is attached to and is driven by the gear 107, the gear 108 meshing with a ring gear 109 carried by the sprocket-positioning plate 93. Rotation of the ring gear 109 by gear 108 causes a relative rotation of the sprocket-positioning plate 93 on the drive plate 10, and accordingly positions the sprockets 22 and 23 and the rollers 17 at the desired predetermined radial distance from the rotative axis of drive plate 10.

Upon turning the crank 92, the radial distance of the sprockets 22 and 23 and the length of the chain perimeter will be synchronously adjusted to maintain meshing engagement of the sprockets 22 and 23 with the chain sections 31 and 30 respectively, incident to selecting a predetermined speed ratio between the drive shaft 45 and the driven shaft 13. Turning of crank 92 rotates the radius control screw 95 and causes axial movement of control slide 97 in a direction depending upon the direction of rotation of the radius control screw 95. The fork 100 carried by the control slide 97 actuates the hydraulic unit 103, and hence the hydraulic unit 104 to cause rack 106 to turn the gear 107 and hence turn the gear 108. The turning of gear 108 will cause rotation of the ring gear 109, and hence cause a turning of the sprocket-positioning plate 93 relative to the drive plate 10. Upon this relative movement of plates 93 and 10, the margins defining the arcuate slots 94 will move the bearing blocks 15 either radially inward or outward, and hence adjust the radial positions of the sprockets 22 and 23 and of the rollers 17. Simultaneously, turning of the crank 92 will cause a rotation of the splined shaft 83, and will consequently turn the screw gears 84. Meshing engagement of the screw gears 84 with the worm gears 85 will turn the feed sprockets 73, and will consequently either lengthen or shorten the chain sections 30 and 31 to accommodate the change in radial positions of the sprockets 22 and 23 and the rollers 17. Meshing engagement of the screw gears 84 and the worm gears 85 is maintained during reciprocative sliding action of the slide members 32 and 33 because the screw gears 84 can move axially on the splined shaft 83.

A sprocket synchronization mechanism operatively connects the sprocket-adjusting means and the chain-adjusting means to the drive means to advance one sprocket 22 or 23 relative to the other sprocket so that the angular difference in the two sprockets 22 and 23 assures operative meshing with the chain sections 31 and 30 regardless of a change in the length of the chain perimeter. Specifically, the angular difference in the two sprockets 22 and 23 is coordinated to the distance across link space at the centers of restriction, whereby the sprocket that is free of engagement with its associated chain section will be positioned to mesh with the associated chain section it is approaching.

The sprocket-synchronization mechanism includes an eccentric cam 110 formed on the end of the radius control screw 95. A forked rocker arm 111 is fastened to the drive plate support 11 by a pin 112, the rocker arm 111 engaging the eccentric cam 110 as a follower. As the drive plate 10 rotates, the cam 110 imparts a reciprocating motion to the rocker arm 111 which, in turn, reciprocates a screw slide 113. Received in the screw slide 113 is a concentrically mounted square shaft 114 and an external screw shaft 115. These shafts 114 and 115 constitute metering shafts, and are independent of each other except through connection by the screw slide 113. The square shaft 114 and screw shaft 115 are rotatively mounted in end supports 116 and 117. Helical gears 120 connect the screw shaft 115 to shaft 121 on which the screw gear 62 is mounted. Similar helical gears 119 within the support 116 operatively interconnect the square shaft 114 with the shaft 122 that carries the screw gear 63.

When the drive plate 10 is turned, the rocker arm 111 carried by the drive plate support 11 is given a relatively reciprocating motion by the interaction of the rocker arm 111 with the eccentric cam 110. This reciprocating motion causes the screw slide 113 to move along the screw shaft 115 and square shaft 114. The rotation produced by the interaction of the screw shaft 115 and the square shaft 114 in the screw slide 113 causes a rotation of the ring gear 56 or ring gear 57 through the meshing action of screw gears 62 and 63 with the associated worm gears 60 and 61 respectively. Limit clutches 123 at the opposed ends of the screw shaft 115 and square shaft 114 assure rotation of these shafts in a forward motion only. This type of limit clutch 123 is shown in FIG. 12. Consequently, the screw shaft 115 and the square shaft 114 will turn only in the direction that will cause the sprockets 22 and 23 to advance. The ring gear 56 or 57 which rotates is dependent on which sprocket 22 or 23 is not engaged with its associated chain section 31 or 30.

The eccentric cam 110 is synchronized in the chain-adjusting means and the sprocket-adjusting means so that the sprockets 22 and 23 pass through the centers of restriction of chain sections 30 and 31 at either slide member 32 or 33. The orientation of one sprocket 22 or 23 to the other sprocket is such that the difference in the two sprockets 22 and 23 is perfectly coordinated to equal the distance across the link space at the centers of restriction. Therefore, the sprocket that is free of its associated chain section will be correctly positioned to mesh with such chain section as it approaches.

This transmission is provided with a means of providing zero speed of the driven shaft 13 while maintaining constant mechanical connection with the drive shaft 45. This means includes a sun gear 124 fastened to and driven by the drive shaft 45. A cooperating ring gear 125 is fixed to and rotatable with the driven shaft 13. The sun gear 124 and the ring gear 125 are operatively interconnected by planetary gears 126 carried by a planetary carrier 127 rotatively mounted on and located concentrically with the drive shaft 45. A pulley 130 is drivingly attached to the planetary carrier 127.

When the sun gear 124 rotates, the planetary gear 126 turns within the ring gear 125. It will be understood that the ring gear 125 turns with the driven shaft 13 and the rotatable drive plate 10. The speed of the ring gear 125 is varied by changing the speed ratio of the transmission as previously described. By appropriate design of the internal gear ratios of the transmission, the pulley 130, fastened to the planetary carrier 127, can be made to change its speed of rotation, its direction of rotation, or stop, while remaining positively mechanically connected to the drive shaft 45.

Although the invention has been described by making detailed reference to a single preferred embodiment, such detail is to be understood in an instructive, rather than in any restrictive sense, many variants being possible within the scope of the claims hereunto appended.

I claim as my invention:

1. In a variable speed transmission:
   (a) a drive shaft,
   (b) a rotary head defining a rotative axis,
   (c) a driven shaft operatively connected to and driven by the rotary head,
   (d) sprockets rotatively mounted on and carried by the rotary head,
   (e) a non-rotating chain defining a perimeter and meshing with the sprockets,
   (f) a drive means operatively interconnecting the drive shaft and sprockets to rotate the sprockets, and consequently turn the rotary head and the driven shaft as the sprockets move around the chain,
   (g) a mechanism carrying the chain and movable to accommodate the flexing action of the chain as the sprockets revolve around the chain perimeter,
   (h) sprocket-adjusting means operatively connected to the sprockets to position the sprockets selectively at predetermined distances from the rotative axis of the rotary head to vary the speed ratio of the drive shaft and driven shaft, and
   (i) chain-adjusting means operatively connected to the chain for selectively changing the length of the chain perimeter to accommodate any change in sprocket position and to maintain effective meshing engagement of the sprockets and chain.

2. In a variable speed transmission as defined in claim 1, in which:
   (j) means operatively interconnects the sprocket-adjusting means and chain-adjustaing means so as to vary synchronously the radial distance of the sprockets and the length of the chain perimeter.

3. In a variable speed transmission as defined in claim 1, in which:
   (j) the rotary head includes a drive plate provided with a radial slot,
   (k) a bearing block slidably mounts the sprockets in the radial slot,
   (l) a positioning plate is rotatively mounted on and is carried by the drive plate to rotate therewith, the positioning plate including cam means operatively connected to the sprockets and block, and
   (m) means is operatively connected to the positioning plate to turn the positioning plate relative to the drive plate so that the cam means selectively changes the position of the bearing block in the radial slot, and thereby changes the radial position of the sprockets.

4. In a variable speed transmission as defined in claim 1, in which:
   (j) one end of the chain is fixed to the said mechanism at a center of restriction,
   (k) the chain-adjusting means includes a guide that engages an adjacent end of the chain to define a coincident center of restriction,
   (l) a feed wheel is carried by the mechanism and operatively receives the said adjacent chain end from the guide, and
   (m) means is operatively connected to the feed wheel so as to turn the feed wheel and thereby shorten or lengthen the chain perimeter, while the guide maintains the coincident centers of restriction.

5. In a variable speed transmission as defined in claim 4, in which:
   (n) a centerless bearing mounts the chain guide,
   (o) a journal block is slidably mounted in the mechanism and carries the feed wheel, and
   (p) a positive connection is provided between the centerless bearing and the journal block to move the feed wheel toward or away from the guide depending on the direction of rotation of the chain guide to keep the chain at substantially constant tension regardless of the flexing of the chain at the centers of restriction.

6. In a variable speed transmission as defined in claim 5, in which:
   (q) the said means operatively connected to the feed wheel includes a splined shaft,
   (r) a screw is slidably mounted on the splined shaft so as to shift axially yet be driven thereby, and
   (s) a worm gear is rotatable with the feed wheel and is carried by the journal block,
   (t) the worm gear meshing with the screw whereby turning of the splined shaft causes turning of the feed wheel to shorten or lengthen the chain perimeter, and
   (u) the screw shifting axially on the splined shaft to accommodate movement of the feed wheel and journal block relative to the chain guide incident to maintain chain tension.

7. In a variable speed transmission as defined in claim 1, in which:
   (j) the chain includes a pair of relatively offset chain sections, each section comprising substantially one-half the perimeter enclosing the sprockets, and
   (k) the sprockets comprise a pair of relatively offset sprockets alternately meshing with the chain sections.

8. In a variable speed transmission as defined in claim 7, in which:
   (l) a sprocket synchronization mechanism operatively connects the sprocket-adjusting means and the chain-adjusting means to the drive means to advance one sprocket relative to the other sprocket so that the angular difference in the two sprockets assures operative meshing with the chain sections regardless of a change in chain perimeter length.

9. In a variable speed transmission as defined in claim 7, in which:
   (l) the drive means includes a pair of drive trains interconnected operatively to the drive shaft, each drive train being operatively connected to one of the pair of sprockets to drive the sprockets independently.

10. In a variable speed transmission as defined in claim 9, in which:
    (m) a sprocket synchronization mechanism operatively connects the sprocket-adjusting means and the chain-adjusting means to each of the drive trains to advance one sprocket relative to the other sprocket so that the angular difference in the two sprockets is coordinated to the distance across link space at the centers of restriction, whereby the sprocket that is free will be positioned to mesh with the associated chain section that such free sprocket is approaching.

11. In a variable speed transmission as defined in claim 1, in which:
 (j) the sprocket synchronization mechanism includes a cam operatively connected to the sprocket-adjusting means and the chain-adjusting means, the cam being eccentric to the rotative axis of the rotary head,
 (k) a screw slide is reciprocatively actuated by the cam,
 (l) a pair of metering shafts are received in and operatively connected to the screw slide for rotation upon reciprocation of the screw slide, and
 (m) gear means operatively interconnects each metering shaft to one of the drive trains to advance one sprocket relative to the other sprocket so that the angular difference in the two sprockets is coordinated to assure operative meshing with the chain sections regardless of a change in chain perimeter length.

12. In a variable speed transmission as defined in claim 11, in which:
 (n) limit clutches are operatively connected to the metering shafts so that the metering shafts will rotate only in a direction that will cause the sprockets to advance in the direction of their rotation.

13. In a variable speed transmission as defined in claim 7, in which:
 (l) the said mechanism includes a pair of slide members, each carrying one end of each chain section,
 (m) the chain-adjusting means is operatively connected to each chain section for selectively changing the length of the chain perimeter,
 (n) the drive means includes differential gearing operatively interconnecting the drive shaft to each of the pair of sprockets to drive the sprockets independently, and
 (o) a sprocket-synchronization mechanism operatively connects the sprocket-adjusting means and the chain-adjusting means to the differential gearing to advance one sprocket relative to the other sprocket so that the angular difference in the two sprockets assures operative meshing with the chain sections regardless of a change in chain perimeter length.

14. In a variable speed transmission as defined in claim 13, in which:
 (p) the differential gearing includes a sun gear drivingly connected to the drive shaft,
 (q) a pair of ring gears, each of which is operatively and drivingly connected to one of the pair of sprockets,
 (r) a pair of planetary gear carriers operatively connected to the sprockets,
 (s) planetary gears carried by each planetary gear carrier, the planetary gears of each planetary gear carrier interconnecting the sun gear with one of the ring gears, and
 (t) the sprocket synchronization mechanism is operatively connected to the ring gears to turn the ring gears and thereby advance one sprocket relative to the other sprocket.

15. In a variable speed transmission as defined in claim 14, in which:
 (u) a worm gear operatively engaging each ring gear, and
 (v) the sprocket synchronization mechanism includes a pair of individually operable screws opeartively connected to the sprocket-adjusting means and the chain-adjusting means, each screw being operatively connected to one of the worm gears to rotate the associated ring gear to adavnce the sprocket that is free relative to the other sprocket whereby the free sprocket will be positioned to mesh with the associated chain section the free sprocket is approaching.

16. In a variable speed transmission as defined in claim 15, in which:
 (w) The sprocket synchronization mechanism includes a cam operatively connected to the sprocket-adjusting means and the chain-adjusting means, the cam being eccentrically positioned relative to the rotative axis of the rotary head,
 (x) a screw slide is reciprocatively actuated by the cam,
 (y) a pair of metering shafts are received in and operatively connected to the screw slide for rotation upon reciprocation of the screw slide, and
 (z) the screws are operatively connected to the metering shafts for rotation to turn the associated worm gears and ring gears.

17. In a variable speed transmission as defined in claim 1, in which:
 (j) a differential gearing includes a sun gear element, a ring gear element, a planetary carrier element and planetary gears carried by the planetary carrier element,
 (k) one of the said elements is operatively and drivingly connected to the drive shaft,
 (l) another one of the said elements is operatively and drivingly connected to the rotary head, and
 (m) means is operatively and drivingly connected to still another one of the said elements to regulate the speed and direction of rotation of the driven shaft.

18. In a variable speed transmission as defined in claim 1, in which:
 (j) a differential gearing includes a sun gear operatively and drivingly connected to the drive shaft,
 (k) a ring gear operatively and drivingly connected to the rotary head,
 (l) a planetary carrier,
 (m) planetary gears carried by the planetary carrier and interconnecting the sun gear and ring gear, and
 (n) means is operatively and drivingly connected to the planetary carrier to regulate the speed and direction of rotation of the driven shaft.

References Cited
UNITED STATES PATENTS

| | | | |
|---|---|---|---|
| 892,325 | 6/1908 | Steinle et al. | 74—793 |
| 980,847 | 1/1911 | Steinle et al. | 74—793 |
| 2,669,885 | 2/1954 | Fedri | 74—785 X |

ROBERT M. WALKER, *Primary Examiner.*

ARTHUR T. McKEON, *Examiner.*